C. B. HIGGINS.
AUTOMATIC CUT-OFF MACHINE.
APPLICATION FILED JUNE 9, 1920.

1,431,305.

Patented Oct. 10, 1922.
2 SHEETS—SHEET 1.

INVENTOR
CLIFFORD B. HIGGINS,
BY
ATTORNEYS

C. B. HIGGINS.
AUTOMATIC CUT-OFF MACHINE.
APPLICATION FILED JUNE 9, 1920.

1,431,305.

Patented Oct. 10, 1922.
2 SHEETS—SHEET 2.

INVENTOR
CLIFFORD B. HIGGINS
BY
ATTORNEYS

Patented Oct. 10, 1922.

1,431,305

UNITED STATES PATENT OFFICE.

CLIFFORD B. HIGGINS, OF DETROIT, MICHIGAN.

AUTOMATIC CUT-OFF MACHINE.

Application filed June 9, 1920. Serial No. 387,622.

*To all whom it may concern:*

Be it known that I, CLIFFORD B. HIGGINS, a citizen of the United States of America, residing at Detroit, in the county of Wayne and State of Michigan, have invented certain new and useful Improvements in Automatic Cut-Off Machines, of which the following is a specification, reference being had therein to the accompanying drawings.

This invention relates to a tube or stock severing machine and my invention aims to provide a machine that may be advantageously used for cutting, sawing or otherwise severing tubes, bars, rods or other stock fed into the machine, and provision is made, as hereinafter set forth for severing the stock into predetermined and desired lengths.

My invention further aims to provide a machine of the above type embodying a tube or stock feeding device; a rotary, friction driven, saw table; and, individual adjustable saws for the table. The individual saws are disposed so as to be driven during rotation of the table and the operation of the feeding device is in timed relation to the movement of the table, so that the saws thereon will cut or sever the stock in planes at a right angle to the longitudinal axis of the stock, thus avoiding any curved or irregular severed end on the stock.

My invention further aims to provide a machine of the above type wherein the parts are constructed with a view of reducing the cost of manufacture, and at the same time retain those features by which durability, safety, and ease of adjustment and assembling are secured. With such ends in view, my invention resides in the novel combination and arrangement of parts to be hereinafter described and then claimed.

Reference will now be had to the drawings, wherein

Figure 1:
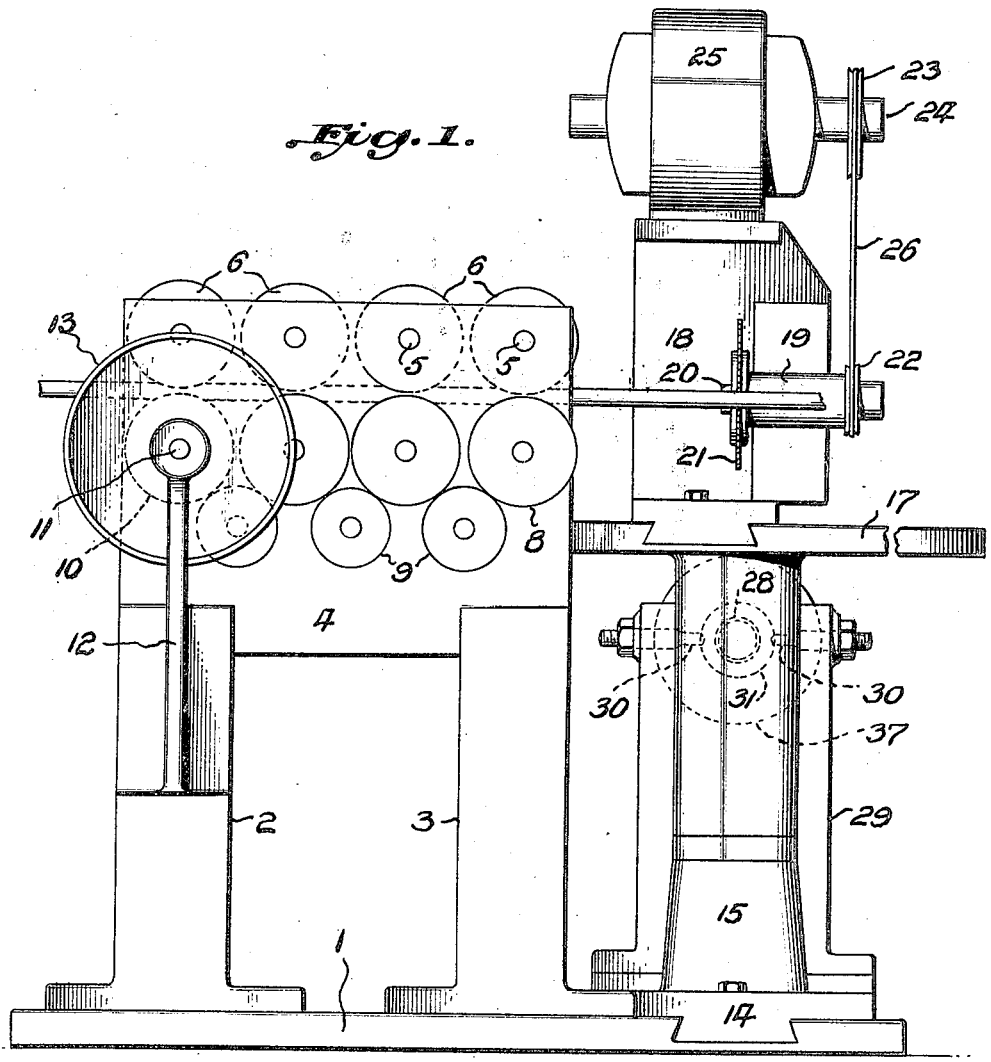
Figure 1 is a front elevation of the machine.
Figure 2:
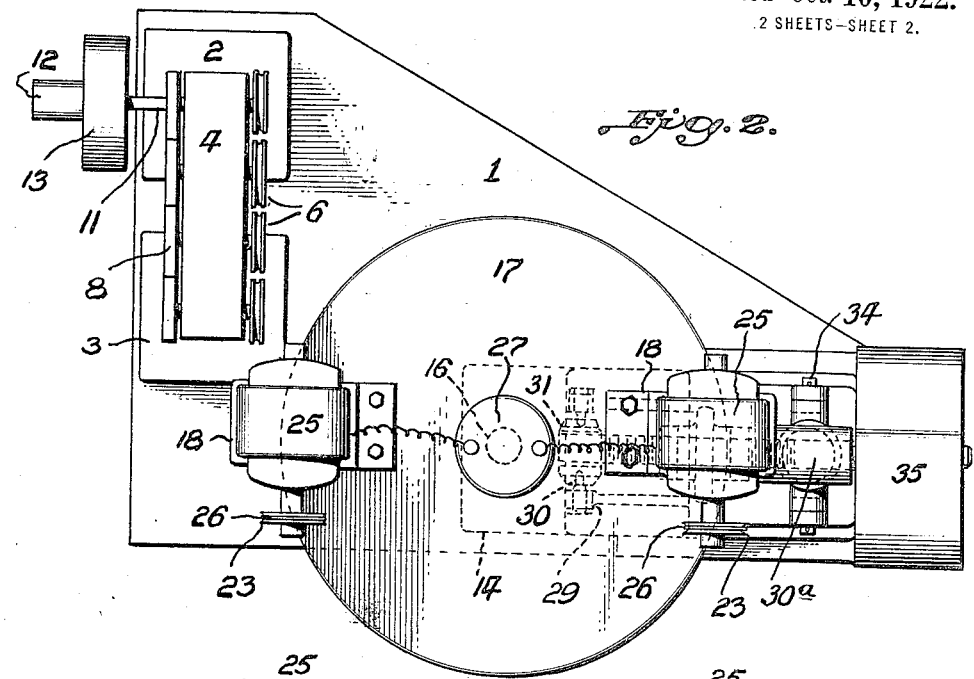
Fig. 2 is a plan of the same.
Figure 3:
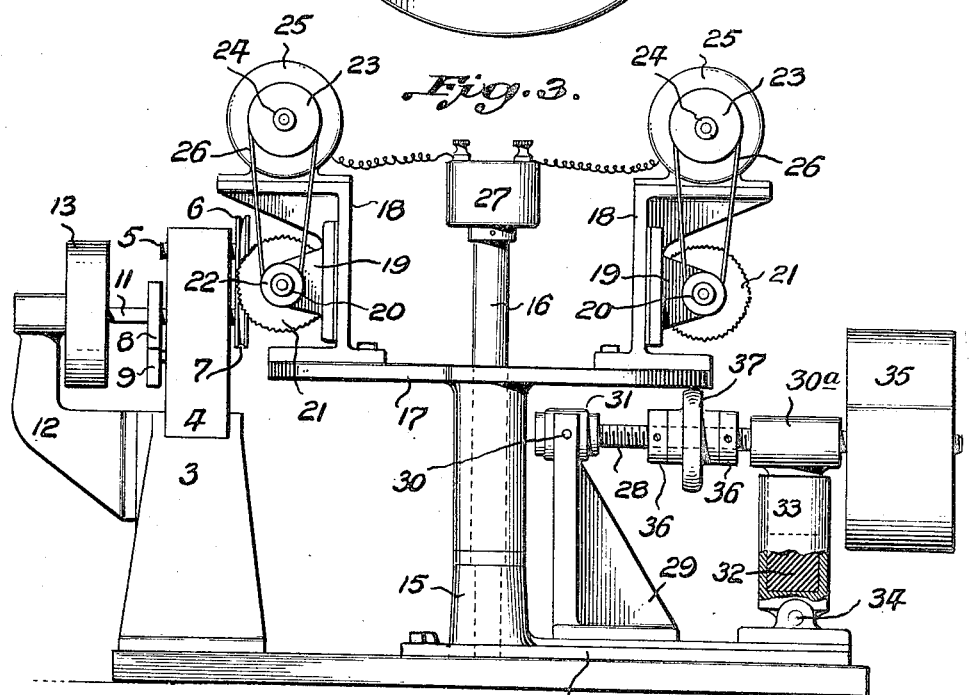
Fig. 3 is a side elevation of the machine, partly broken away and partly in section.

The machine comprises a base 1 and mounted thereon are supports 2 and 3 for a bearing 4. Journaled in the bearing 4 are the spindles 5 of an upper set of feed rolls 6 and a lower set of feed rolls 7, said rolls being positioned so as to provide a pass therebetween for various kinds of stock. The rolls 6 and 7 may be interchangeable so that different sizes and shapes of rolls may be used for various kinds of stock. The spindles of the lower set of rolls 7 are provided with gear wheels 8 driven by a train of gear wheels 9 and all of said gear wheels have movement imparted thereto from a main gear wheel 10 on a power shaft 11 which forms one of the spindles of the lower set of feed rolls. The power shaft 11 extends into a bracket or bearing 12, carried by the support 2, and said shaft has a power wheel 13 which may be driven by a belt or other power transmission member from a suitable source of power.

On the base 1 and extending at a right angle to the vertical plane of the device is an adjustable base 14 for a pedestal 15 having a central post 16. Rotatable on the pedestal 15 about the post 16 is a rotary table 17 and adjustably mounted on this table, at the peripheral edges thereof, are one or more individual saw units.

Each saw unit comprises a bracket adjustable on the table 17 and said bracket is provided with a bearing 19 for a shaft or arbor 20 having a cutting, sawing, or severing instrumentality, as a circular saw 21. On the shaft or arbor 20 is a pulley 22 and alining with said pulley is another pulley 23 on the armature shaft 24 of an electric motor 25 mounted on the bracket 18. An endless belt 26 is trained about the pulleys 22 and 23, and the electric motor 25 is electrically connected to a distributor 27 mounted on the post 16, said distributor receiving current from a suitable source of electrical energy (not shown).

Mounted on the adjustable base 14 is an adjustable friction drive mechanism for the rotary table 17, and the mechanism includes a tiltable drive shaft 28 having one end thereof pivotally supported by a bearing 29 and the opposite end thereof yieldably supported by a bearing 30ª. The bearing 29 is fixed on the base 14 and has its upper end bifurcated and provided with opposed needle point pintles 30 for a hub 31 in which the shaft 28 revolves. The bearing 30ª is yieldably supported on a cushion member 32, preferably made of rubber, mounted in a socket member 33 pivotally connected to the base 14, as at 34.

On one end of the shaft 28 is a power wheel 35 over which may be trained a belt or other power transmission mechanism so that the shaft 28 may be driven from a suitable source of power (not shown). The shaft 28 is screw-threaded to receive jam nuts 36 and these jam nuts are adapted to correctly position a friction disk or wheel 37 on the shaft 28 with the periphery of the disk or wheel engaging the lower face of the table 17 to impart movement thereto. It is through the medium of the adjustable disk or wheel 37 that the speed of the rotary table 17 may be regulated relative to the speed of the shaft 28, and in the operation of the machine the friction disk 37 is set so as to impart movement to the rotary table 17 that will be in timed relation to the operation of the feeding device. The time at which a saw becomes active relative to a piece of stock depends on the number of saws mounted on the table 17 and the speed at which the table revolves, and the output of the machine as well as the length of stock being produced depends on a defined cooperation between the feeding device and the rotary table. Considering certain aspects of the invention it is possible to provide the table with a plurality of saws and operate the table at such speed that numerous lengths of material will be cut from a piece of stock slowly fed by the feeding device, and by reference to Fig. 1, it will be noted that the stock is advanced at a right angle to the plane of rotation of the circular saw 21. To prevent this circular saw from producing a curved or irregular cut, it is essential that the movement of the table 17 be in proper timed relation to the feeding of the stock, so that the stock will be advanced as the circular driven saw is swung in an arc relative to the piece of stock. The piece of stock must be advanced in proper ratio to the arc movement of the saw, whereby the severing of the stock is in a plane transverse to the axis of the piece of stock. It is obvious that as such a cut is accomplished that the saw which performs the cut moves out of the road of the continuously advancing stock, and that eventually another saw is brought into operative relation to sever the stock for a desired length.

My invention is not necessarily limited to individual operative means for the saws nor to separate sources of power for the power wheels 13 and 35, and such other changes as are permissible by the appended claims may be resorted to without departing from the spirit of the invention.

What I claim is:—

1. In a stock severing machine, a power operated stock feeding device, a power operated table adapted to be revolved in timed relation to the feeding of stock by said feeding device, and individual severing instrumentalities on said table adapted to sever the stock fed by said device.

2. A stock severing machine as characterized in claim 1, wherein the table is friction driven by a mechanism adapted for regulating the speed of the table relative to its power operating means.

3. Means for severing stock comprising a stock feeding device, severing instrumentalities adapted to move in an arc relative to the stock fed by said device and successively engage the stock to cut it into lengths, and means to move said severing instrumentalities in timed relation to the feeding of stock by said device.

4. Means as characterized in claim 3, wherein a table supports said severing instrumentalities, and said means engages the last mentioned table by friction to impart movement thereto.

5. A stock sawing machine comprising a stock feeding device, a rotary horizontal table, individual motor operated saws adjustable on said table and adapted to be successively brought into engagement with stock fed by said device to saw the stock into lengths determined by the relative speeds of the table and feeding device and the position of the saws on said table, and means for operating said table.

6. A stock sawing machine as characterized in claim 5 wherein said means includes an adjustable friction drive mechanism.

In testimony whereof I affix my signature in the presence of two witnesses.

CLIFFORD B. HIGGINS.

Witnesses:
O. F. BARTHEL,
ANNA M. DORR.